United States Patent
Iwai

(10) Patent No.: US 8,605,582 B2
(45) Date of Patent: Dec. 10, 2013

(54) IP NETWORK SYSTEM AND ITS ACCESS CONTROL METHOD, IP ADDRESS DISTRIBUTING DEVICE, AND IP ADDRESS DISTRIBUTING METHOD

(75) Inventor: Takanori Iwai, Minato-ku (JP)

(73) Assignee: NEC Corporation, Tokyo (JP)

( * ) Notice: Subject to any disclaimer, the term of this patent is extended or adjusted under 35 U.S.C. 154(b) by 376 days.

(21) Appl. No.: 12/266,097

(22) Filed: Nov. 6, 2008

(65) Prior Publication Data

US 2009/0122798 A1 May 14, 2009

(30) Foreign Application Priority Data

Nov. 8, 2007 (JP) ................................. 2007-290937

(51) Int. Cl.
*H04J 3/24* (2006.01)
(52) U.S. Cl.
USPC ........................................... 370/230; 370/471
(58) Field of Classification Search
None
See application file for complete search history.

(56) References Cited

U.S. PATENT DOCUMENTS

| | | | |
|---|---|---|---|
| 6,219,715 B1* | 4/2001 | Ohno et al. | 709/245 |
| 6,412,003 B1* | 6/2002 | Melen | 709/225 |
| 6,578,088 B2* | 6/2003 | Ohno et al. | 709/245 |
| 6,865,184 B2* | 3/2005 | Thubert et al. | 370/401 |
| 6,922,410 B1* | 7/2005 | O'Connell | 370/401 |
| 7,313,632 B2* | 12/2007 | Hwang | 709/245 |
| 7,315,519 B2* | 1/2008 | Sarikaya et al. | 370/310 |
| 7,352,853 B1* | 4/2008 | Shen et al. | 379/201.12 |
| 7,397,911 B2* | 7/2008 | Shen et al. | 379/219 |
| 7,650,148 B2* | 1/2010 | Kim et al. | 455/435.1 |
| 8,179,888 B2* | 5/2012 | Chen et al. | 370/389 |
| 2001/0005858 A1* | 6/2001 | Ohno et al. | 709/223 |
| 2005/0041671 A1* | 2/2005 | Ikeda et al. | 370/395.52 |
| 2006/0056420 A1* | 3/2006 | Okuda et al. | 370/395.54 |
| 2006/0199586 A1* | 9/2006 | Yoon | 455/437 |
| 2007/0211626 A1* | 9/2007 | Gooch et al. | 370/229 |
| 2007/0266163 A1* | 11/2007 | Xiong et al. | 709/228 |
| 2008/0200143 A1* | 8/2008 | Qiu et al. | 455/404.2 |

FOREIGN PATENT DOCUMENTS

| | | |
|---|---|---|
| JP | 10-135982 A | 5/1998 |
| JP | 2004-172931 A | 6/2004 |

* cited by examiner

*Primary Examiner* — Gregory Sefcheck
(74) *Attorney, Agent, or Firm* — Sughrue Mion, PLLC

(57) ABSTRACT

An IP network system includes an IP address generating device that sets a specific area in a node identifier of an IP address as an access control area that can be filtered by a network layer control device, and generates an IP address including a communication policy of the IP network system embedded in the access control area, and the network layer control device capable of filtering the access control area, wherein the network layer control device is configured to perform filtering setting according to the communication policy and thereby performs access control.

25 Claims, 13 Drawing Sheets

ADDRESS DISTRIBUTING SERVER

| USER ID | USER NAME | DEPARTMENT | POSITION |
|---------|-----------|------------|----------|
| 00001 | ICHIRO AIBA | SALES DEPT. | EXECUTIVE LEVEL |
| 00002 | JIRO ITO | DEVELOPMENT DEPT. | EXECUTIVE LEVEL |
| 00003 | SABURO UEDA | DEVELOPMENT DEPT. | GENERAL LEVEL |
| 00004 | SHIRO ENDO | SALES DEPT. | GENERAL LEVEL |

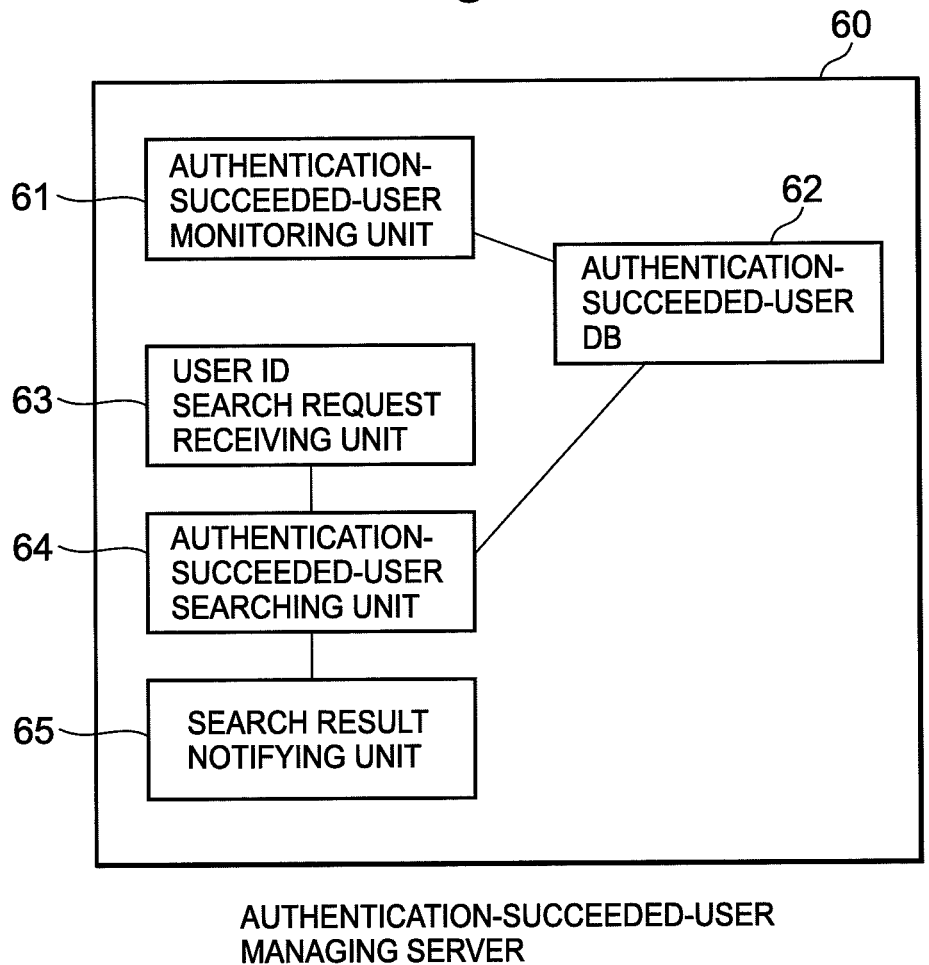

| TYPE | RANGE | SET VALUE | FILTERING POLICY |
|---|---|---|---|
| src | ::8000:0:0:0 | 1 | PERMITTED |
| src | ::8000:0:0:0 | 0 | REJECTED |

ACCESS CONTROL DATA (1 BIT)
1 : PASSAGE PERMITTED
0 : PASSAGE NOT PERMITTED

| USER NAME | CORE NETWORK CONNECTION POLICY |
|---|---|
| ICHIRO AIBA | PERMITTED |
| JIRO ITO | NOT PERMITTED |
| SABURO UEDA | NOT PERMITTED |
| SHIRO ENDO | PERMITTED |

Fig. 11

| ADDRESS GENERATION AREA | NUMBER OF BITS | REFER TO : |
|---|---|---|
| FFFF : FFFF : FFFF : FFFF : : | 64 | REQUEST |
| : : 8000 : 0 : 0 : 0 : | 1 | ACCESS CONTROL DATA GENERATING UNIT |
| : : 7FFF : FFFF : FFFF : FFFF | 63 | RANDOM DATA GENERATING UNIT |

Fig. 15

| USER NAME | ACCESS TIME PERIOD | CORE NETWORK CONNECTION POLICY |
|---|---|---|
| ICHIRO AIBA | 0:00 TO 11:59 | PERMITTED |
| ICHIRO AIBA | 12:00 TO 23:59 | NOT PERMITTED |
| JIRO ITO | 0:00 TO 11:59 | NOT PERMITTED |
| JIRO ITO | 12:00 TO 23:59 | PERMITTED |
| SABURO UEDA | 0:00 TO 11:59 | PERMITTED |
| SABURO UEDA | 12:00 TO 23:59 | PERMITTED |
| SHIRO ENDO | 0:00 TO 11:59 | NOT PERMITTED |
| SHIRO ENDO | 12:00 TO 23:59 | NOT PERMITTED |

Fig. 17

| DEPARTMENT | POSITION | CORE NETWORK CONNECTION POLICY |
|---|---|---|
| SALES DEPT. | EXECUTIVE LEVEL | PERMITTED |
| SALES DEPT. | REGULAR LEVEL | NOT PERMITTED |
| DEVELOPMENT DEPT. | EXECUTIVE LEVEL | NOT PERMITTED |
| DEVELOPMENT DEPT. | REGULAR LEVEL | NOT PERMITTED |

IP NETWORK SYSTEM AND ITS ACCESS CONTROL METHOD, IP ADDRESS DISTRIBUTING DEVICE, AND IP ADDRESS DISTRIBUTING METHOD

This application is based upon and claims the benefit of priority from Japanese patent application No. 2007-290937, filed on Nov. 8, 2007, the disclosure of which is incorporated herein its entirety by reference.

BACKGROUND

1. Technical Field

Aspects of the present invention relate to an IP (Internet Protocol) network system and its access control method, IP address distributing device and IP address distributing method, and, more specifically, relate to an access control technology using an IP address.

2. Description of the Related Art

Conventionally, in order for a device that controls the network layer (herein after "network layer control device"), such as a router, to perform access control using an IP address, the network layer control device needs to have a setting of permission/non-permission for a transfer of packet based on the IP address. To perform access control, at the network layer, for each user by using the network layer control device, a communication policy, for each user, of permission/non-permission for communication is first determined. Then, a MAC (Media Access Control) address of a terminal used by each user and an IP address used by each user are managed in association with each other. Access control is eventually implemented by setting, for the network layer control device such as a router, permission/non-permission for communication using the IP address according to the communication policy for each user. In this case, when the user changes the IP address to use, the setting of the network layer control device must be changed according to the change. In addition, when the user changes the terminal to use, the MAC address must be changed, as well.

As related art, Japanese Patent Laid-Open No. 2004-172931 (hereinafter "Patent Document 1") discloses a firewall system supporting dynamic IP address assignment. The system disclosed in Patent Document 1 controls, based on the MAC address of each terminal, access to the Internet from a terminal to which an IP address with an assignment time limit has been dynamically assigned, and blocks access to the Internet from a terminal using an IP address with an expired assignment time limit.

In addition, Japanese Patent Laid-Open No. Hei. 10-135982 (Hereinafter "Patent Document 2" discloses a technology for assigning multiple IP addresses to one MAC address. In the Patent Document 2, activation of a different server application is thereby enabled among multiple server applications that have been waiting for an incoming transmission at the same port number, if the IP addresses are different even though the MAC address and the port number are the same.

However, when access control using an IP address specific to each user is performed in an IP network system using the network layer control device such as a router according to the related arts as described above, the following problems occur.

If a network layer control device such as a router according to the related art performs filtering for individual users on the basis of an IP address used by each user, the router setting for the entire IP network system has to be changed every time the IP address used by each user or a communication policy for each user is changed. This increases the load of the router to perform setting change processing. Even if the IP address used by each user or the communication policy for each user is fixed to avoid the increase of the load to perform the setting change processing, various other problems, as described below, result.

If an IP address used by each user is set as a fixed address, for example, an IP network system administrator has to manually manage the association between a user and an IP address to be used by the user. As a result, the workload of the administrator is increased. If a communication policy for a user is fixed, for example, the IP network system will lose flexibility and become inconvenient.

SUMMARY

An aspect of the present invention is to provide an IP network system and its access control method, an IP address distributing device and an IP address distributing method that implement filtering for individual users based on an IP address without changing filtering settings of a network layer control device in response to a change in the use environment of the network for each user, such as an IP address used by each user or an access authority of each user. Embodiments of the present invention also overcome disadvantages not described above. Indeed, certain embodiments of the present invention may not overcome any of the problems described above.

An aspect of the present invention concerning an IP address generating device is configured to set a specific area in a node identifier of an IP address as an access control area that can be filtered by a network layer control device in an IP network system, and to generate an IP address including a communication policy of the IP network system embedded in the access control area.

An aspect of the present invention concerning an IP network system includes an IP address generating device that sets a specific area in a node identifier of an IP address as an access control area that can be filtered by a network layer control device, and generates an IP address including a communication policy of the IP network system embedded in the access control area, and the network layer control device capable of filtering the access control area, wherein the network layer control device is configured to perform filtering setting according to the communication policy and thereby performs access control.

An aspect of the present invention concerning IP address generating method, with which an IP address generating device generates an IP address for a terminal device, includes setting a specific area in a node identifier of an IP address as an access control area that can be filtered by a network layer control device in an IP network system, and generating an IP address including a communication policy of the IP network system embedded in the access control area.

An aspect of the present invention concerning a method of controlling access in an IP network system including a terminal device, a network layer control device, and an IP address generating device, includes a setting and generating operation of the IP address generating device including setting a specific area in a node identifier of an IP address as an access control area that can be filtered by the network layer control device and generating an IP address including a communication policy of the IP network system embedded in the access control area, a receiving and accessing operation of the terminal device including receiving the IP address generated by the IP address generating device and accessing the IP network system with the received IP address, and a controlling operation of the network layer control device having filtering settings set according to the communication policy including performing access control according to the communication policy, based on the IP address issued by the terminal device.

An aspect of the present invention concerning a program including instructions for enabling a computer, serving as an IP address generating device configured to generate an IP address for a terminal device, to execute processes, includes setting process including setting a specific area in a node identifier of an IP address as an access control area that can be filtered by a network layer control device in an IP network system, and generating process including generating an IP address including a communication policy of the IP network system embedded in the access control area.

BRIEF DESCRIPTION OF THE DRAWINGS

Aspects of the present invention will become more apparent by describing in detail embodiments thereof with reference to the accompanying drawings, in which:

FIG. 4 is a diagram showing a configuration of an authentication-succeeded-user managing server according to a first embodiment of the present invention.

FIG. 5 is a diagram showing an example of setting in an authentication-succeeded-user DB according to a first embodiment of the present invention.

FIG. 11 is an example of setting an IP address generation policy according to a first embodiment of the present invention.

FIG. 15 is a diagram showing an example of setting in a communication policy DB according to a second embodiment of the present invention.

FIG. 17 is a diagram showing an example of setting in a communication policy DB according to a third embodiment of the present invention.

DESCRIPTION OF EMBODIMENTS

Figure 1:
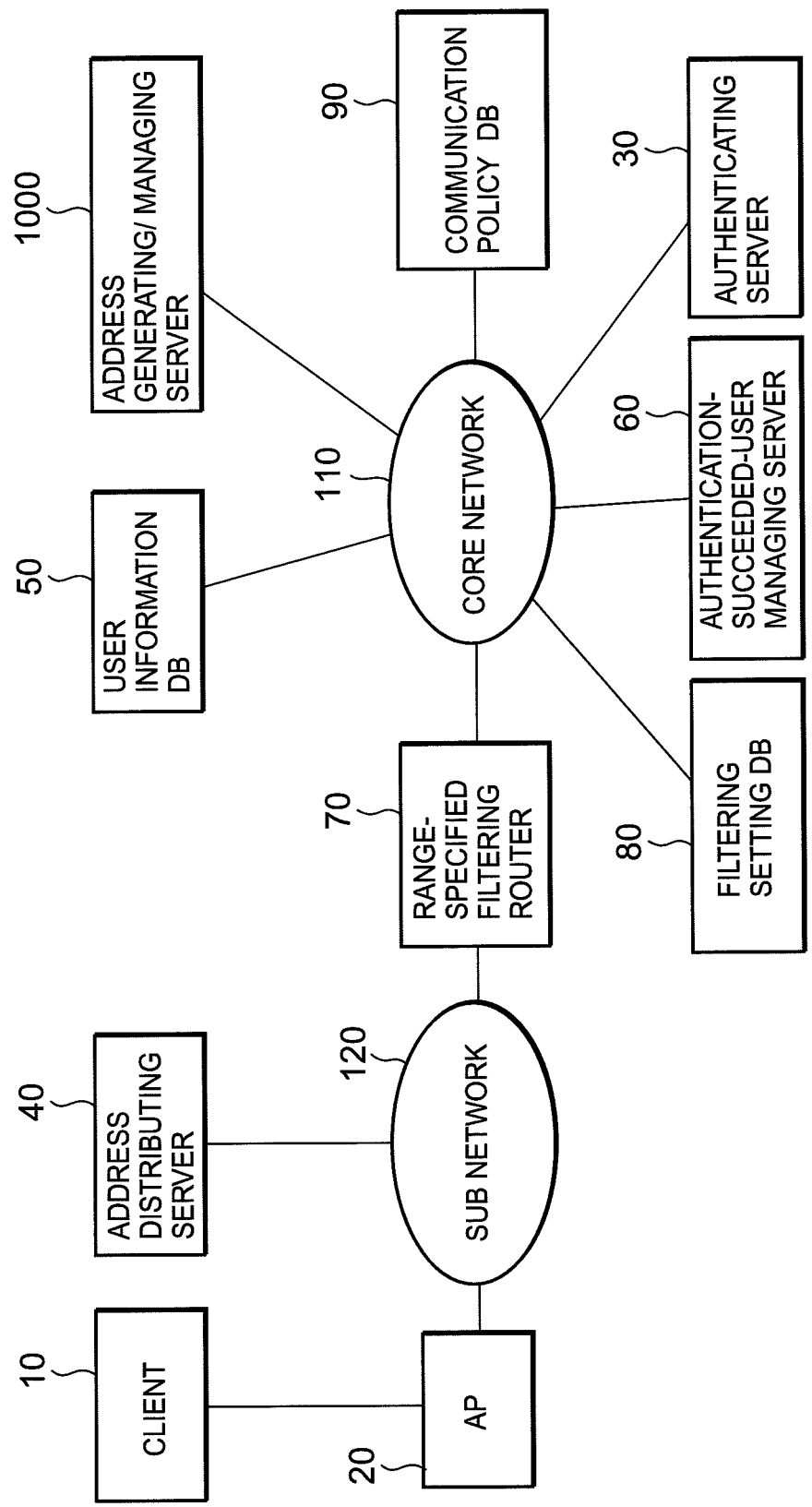
FIG. 1 is a diagram showing a configuration of an IP network system according to a first embodiment of the present invention.

In a schematic configuration of the IP network that illustrates certain embodiments of the present invention, to obtain an IP address, a client (10 in FIG. 1) requests an authenticating server (30 in FIG. 1) to authenticate. If the authentication succeeds, the client requests an address generating/managing server (1000 in FIG. 1) to generate an IP address used to access a core network (110 in FIG. 1). The address generating/managing server (1000 in FIG. 1) sets a specific area in a node identifier of an IP address as an access control area that can be filtered by a range-specified filtering router (70 in FIG. 1), an example of a network layer control device, and generates an IP address with a communication policy of the IP network system embedded in the access control area. The range-specified filtering router (70 in FIG. 1) is a device that can filter based on the access control area, and performs access control for the client (10 in FIG. 1) by performing filtering setting according to the communication policy.

The IP address generating device according to embodiments of the present invention sets a specific area in a node identifier of an IP address as an access control area that can be filtered by a network device of the IP network system. The IP address generating device generates the IP address with a communication policy of the IP network system embedded in the access control area.

When the IP address generating device generates an IP address, a communication policy of the IP network system may be determined based on a user of a terminal to which the IP address is distributed, and the IP address generating device may generate the IP address with the determined communication policy embedded in the access control area of the IP address.

In addition, the IP address generating device may associate user information of a terminal to which an IP address is distributed with a user ID managed by the authenticating server capable of user authentication. Then, when having successfully authenticated the terminal to which an IP address is distributed by the authenticating server, the authenticating server may notify the IP address generating device of the user ID. Thereby, the IP address can be generated only for the terminal the user of which has been successfully authenticated, the IP address having the communication policy of the IP network system, which is based on the user information, embedded in the access control area.

In addition, when the IP address generating device generates an IP address, a latest communication policy may be reflected by referring to a communication policy of the IP network system.

In addition, when the IP address generating device generates an IP address, the IP address generating device may obtain, from the authenticating server, a user ID which is successfully authenticated and a layer-2 identifier, and may thereby generate an IP address corresponding to the user ID even when an identical layer-2 identifier exists.

Here, the layer-2 identifier is an identifier (address) for identifying a communication device in the Data Link Layer, that is, the second layer of the OSI reference model. Identifiers to be used as the layer-2 identifier differ depending on a protocol. To cite an instance, Ethernet (registered trademark) sets a MAC address as an identifier, while dialup connection (PPP) sets a line number used for connection as an identifier.

In the following, although a description is given with a MAC address set as the layer-2 identifier, it is not be limited to the MAC address.

In addition, the IP address generating device may distribute an IP address generated for a terminal by using DHCP (Dynamic Host Configuration Protocol).

In addition, the IP address generating device may set a valid term for an IP address generated according to a communication policy, and notify a terminal of a lease period by using DHCP.

The IP network system according to various embodiments of the present invention include the IP address generating device described above and a network device capable of filtering an access control area of an IP address. Then, the filtering setting of the network device is performed according to a communication policy of the IP network system. In addition, the IP address generating device generates an IP address with the communication policy of the IP network system embedded in the access control area. Therefore, access control according to a communication policy of the IP network system is enabled by using an IP address.

In the above IP network system, which includes the IP address generating device and the networking device, access control of the IP network system can be dynamically performed by dynamically changing data in the access control area of the IP address when the IP address generating device generates an IP address.

In the above IP network system, when generating data in an IP address, a communication policy of the IP network system is determined based on attribute information of a user of a terminal to which the IP address is distributed. Then, data in the access control area is generated according to the determined communication policy. Thereby, filtering control of the IP address based on the user attribute information is enabled.

In addition, in the IP network system, an IP network system is constructed by using a router capable of filtering in a certain area of an IP address, and a setting fixed to the router is performed according to a communication policy of the IP network system. Then, a server that generates for each user an IP address with information embedded in the specific area of the IP address is introduced as an IP address distributing mechanism of the IP network system. The server generates and distributes, for each user successfully authenticated, an IP address corresponding to a communication policy of the IP network system. This enables access control for each user while keeping the setting of router fixed, since the communication policy of the IP network for each user is embedded in the IP address used by the user.

The IP network system is constructed with a router capable of filtering by freely specifying a filtering range of an IP address. Then, a filtering setting common to a specific area of an IP address is set in the router as a communication policy of the entire IP network system. To take an example, the router sets the filtering setting in such a way that "1" is set to the 65th bit of IPv6 address when communication is permitted, or "0" is set to the 65th bit of IPv6 address when communication is rejected.

Next, the address generating/managing server, which generates and manages an IP address for each user corresponding to the communication policy of the entire IP network system, is introduced as an IP address distributing mechanism of the IP network system. Then, when a user terminal uses the IP network system, the address generating/managing server performs user authentication, and distributes the IP address corresponding to a communication policy of the user to a terminal that is successfully authenticated. Use of this IP address enables access control according to the communication policy of the user of the IP network system.

To take an example, if a user's communication policy is to permit use of the IP network, the address generating/managing server distributes an IP address in which the 65th bit of an IPv6 address is "1", after user authentication. On the other hand, if the user's communication policy is to reject communication, the address generating/managing server distributes the IP address in which the 65th bit of the IPv6 address is "0". Use of the IP address in which the 65th bit of the IPv6 address is "1" enables passing through the router in the IP network system, while use of the IP address in which the 65th bit of the IPv6 address of is "0" disables passing through the router in the IP network system.

A node identifier described in each embodiment of the present invention is a host unit for an IPv4 address and an IFID (interface ID) for an IPv6 address. The present invention also supports the IPv4 address, and also can be implemented by filtering a field in a host unit of IPv4 address. Basic operations of IPv4 and IPv6 do not differ. Thus, in order to simplify the description in this specification, a description is given using an IPv6 address for each embodiment.

According to each embodiment of the present invention, as no setting change of a network layer control device such as a router is needed, load of setting for the network layer control device in an entire IP network system can be reduced. In addition, as an access authority of an individual user can be changed in a flexible manner, flexible access control for individual users is enabled. Furthermore, as IP addresses are dynamically distributed, a network administrator's load is also reduced.

In the following, a detailed description is given according to various embodiments and with reference to the drawings.

FIG. 1 is a diagram showing a configuration of an IP network system according to a first embodiment of the present invention. In FIG. 1, an IP network system is divided into a core network 110 being a backbone network and a sub-network 120. The core network 110 is connected to an authenticating server 30, a user information DB 50, an authentication-succeeded-user managing server 60, a range-specified filtering router 70, a filtering setting DB 80, a communication policy DB 90, and an address generating/managing server 1000. In addition, the sub-network 120 is connected to a client 10 via an AP (Access Point) 20, an address distributing server 40, and the core network 110 via the range-specified filtering router 70. Although only one sub-network 120 is shown in the IP network system in FIG. 1 to simplify the description, there may be several sub-networks.

The client 10 is a terminal device to be used by a user and provides the user with communication capability. In addition, the client 10 supports IPv6 addresses and also includes a DHCPv6 client function.

The AP 20 provides the client 10 with connection to the MAC layer or lower. Although the AP 20 is described under the assumption of being a wireless AP in each embodiment of the present invention, the AP 20 may also be implemented with a wired switch. The AP 20 is compliant with 802.1x, which is the standard defining the user authentication scheme in a local area network (LAN), and allows only a terminal successfully authenticated by the server 30 to communicate in the MAC layer.

The authenticating server 30 is a server compliant with 802.1x authentication, and performs user authentication for a user who uses the client 10. The authenticating server 30 also performs logging of a user ID and a MAC address of the user terminal when the user is successfully authenticated.

The address distributing server 40 distributes an address to the client 10. In each embodiment of the present invention, the address distributing server 40 utilizes DHCPv6 protocol, corresponding to IPv6 addresses, although other protocols can be used.

Figures 2, 3:
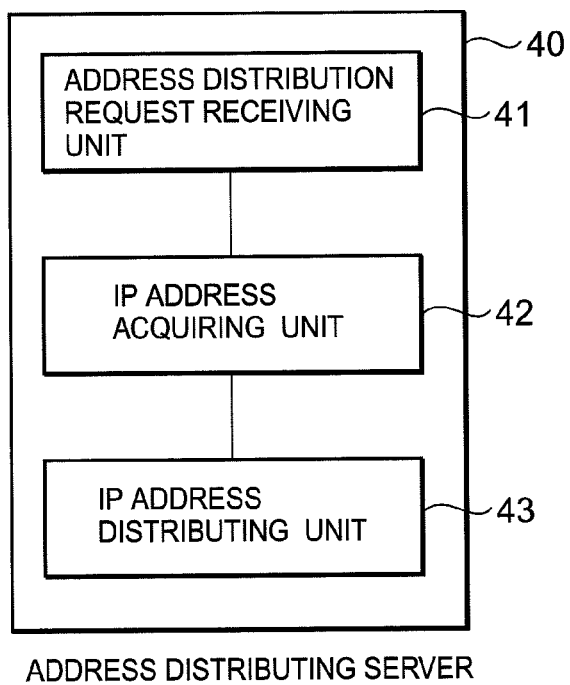
FIG. 2 is a diagram showing a configuration of an address distribution server according to a first embodiment of the present invention.
FIG. 3 is a diagram showing an example of setting in a user information DB (database) according to a first embodiment of the present invention.

FIG. 2 shows a functional configuration of the address distributing server 40. The address distributing server 40 includes an address distribution request receiving unit 41, an IP address acquiring unit 42, and an IP address distributing unit 43. The address distribution request receiving unit 41 receives a request for address distribution from the client 10. The IP address acquiring unit 42 requests the address generating/managing server 1000 to generate an IP address to be distributed to a terminal from which the request has been received, and acquires the IP address thus generated. The IP address distributing unit 43 distributes the IP address acquired by the IP address acquiring unit 42 to the terminal making the request.

The user information DB 50 is a DB (database) that manages user attribute information by associating the user attribute information with a user ID that identifies a user. FIG. 3 shows an example of a data structure of the user information DB 50. For example, the data includes a combination of "User ID", "User Name", "Department", and "Position".

The authentication-succeeded-user managing server 60 monitors a user ID and a MAC address of a terminal of a user successfully authenticated by the authenticating server 30. When receiving an inquiry from the address generating/managing server 1000 as to whether a user, the terminal of which the address generating/managing server 1000 wants to search for, has been successfully authenticated, the authentication-succeeded-user managing server 60 performs a search and notifies the address generating/managing server 1000 of the result.

FIG. 4 is a diagram showing a functional configuration of the authentication-succeeded-user managing server 60. The authentication-succeeded-user managing server 60 includes authentication-succeeded-user monitoring unit 61, authentication-succeeded-user DB 62, user ID search request receiving unit 63, authentication-succeeded-user searching unit 64, and search result notifying unit 65.

The authentication-succeeded-user monitoring unit 61 constantly monitors the result of authentication of the client by the authenticating server 30, and saves, in the authentication-succeeded-user DB 62, a user ID and a MAC address of a terminal of a user successfully authenticated. Several methods of monitoring authentication results of the authenticating server 30 are possible for the authentication-succeeded-user monitoring unit 61. The methods include, for example, monitoring an authentication result from a log of the authenticating server or utilization of a function of the authenticating server 30 such as notifying of a terminal in which an authentication succeeded. However, the method by which the authentication-succeeded-user monitoring unit 61 monitors the authentication result of the authenticating server 30 herein shall be the method of the authentication-succeeded-user monitoring unit 61 constantly monitoring a log of authentication results of the authenticating server 30.

As shown in FIG. 5, the authentication-succeeded-user DB 62 is a DB configured to associate a user ID with a MAC address of a terminal of a user successfully authenticated and to manage the user ID and the MAC address.

The user ID search request receiving unit 63 receives, from the address generating/managing server 1000, a request to perform a search for a user who has been successfully authenticated, and obtains, from the address generating/managing server 1000, the MAC address of a terminal for which the address generating/managing server 1000 wants to search.

The authentication-succeeded-user searching unit 64 searches the authentication-succeeded-user DB 62 to check whether the MAC address obtained by the user ID search request receiving unit 63 exists or not, and obtains a user ID if the corresponding Mac address exists.

The search result notifying unit 65 notifies the address generating/managing server 1000 of a search result upon receiving the search result from the authentication-succeeded-user searching unit 64. If the search has been successful, the search result notifying unit 65 notifies the address generating/managing server 1000 of the user ID successfully authenticated.

The range-specified filtering router 70, which is an example of a network layer control device, is capable of filtering by specifying a range to be filtered in an IP address, i.e., range-specified filtering. If range-specified filtering is available, filtering is enabled only in a node identifier on a link, i.e., a range of IFID for an IPv6 address.

Figures 6, 7:
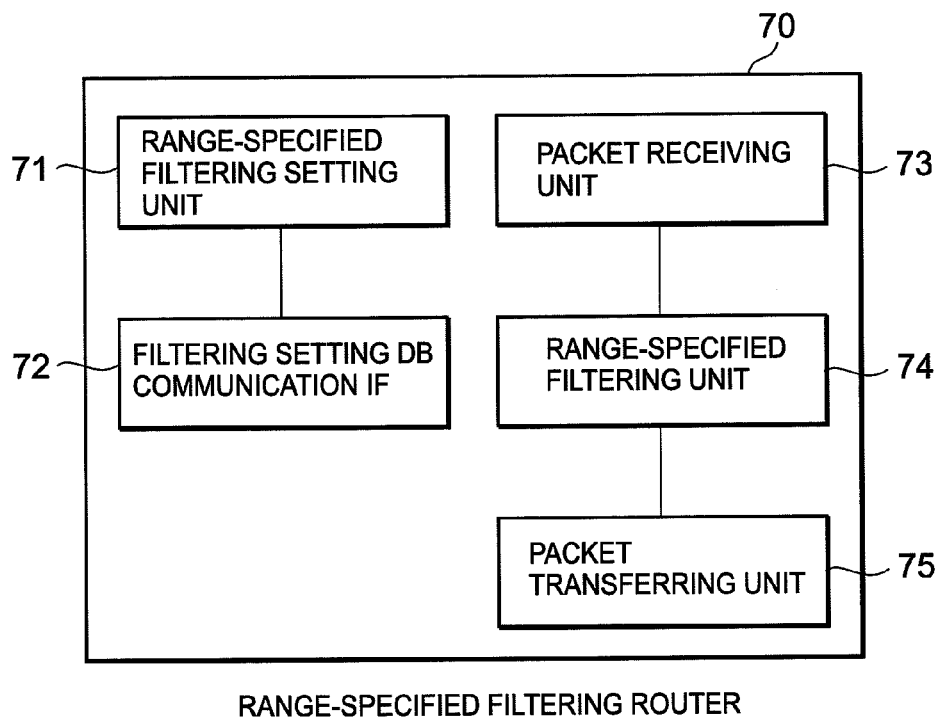
FIG. 6 is a diagram showing a configuration of a range-specified filtering router according to a first embodiment of the present invention.
FIG. 7 is a diagram showing an example in a filtering setting DB according to a first embodiment of the present invention.

FIG. 6 is a diagram showing a functional configuration of the range-specified filtering router 70. The range-specified filtering router 70 includes range-specified filtering setting unit 71, filtering setting DB communication IF 72, packet receiving unit 73, range-specified filtering unit 74, and packet transferring unit 75.

The range-specified filtering setting unit 71 performs a setting of filtering by the range-specified filtering router 70.

The filtering setting DB communication IF 72 obtains filtering setting information by communicating with the filtering setting DB 80, which is referred to when the range-specified filtering setting unit 71 makes a change to filtering setting.

The packet receiving unit 73 receives a packet upon checking an IP address to which the IP packet is sent.

The range-specified filtering unit 74 determines permission/non-permission for a packet transfer according to a preset filtering setting.

The packet transferring unit 75 transfers a packet upon checking an IP address to which the IP packet is sent.

The filtering setting DB 80 manages filtering settings of all of the range-specified filtering routers 70 in the IP network system. Although FIG. 1 shows only one range-specified filtering router 70, several range-specified filtering routers 70 may also exist since several sub-networks 120 may exist. Hence, it may be necessary to uniformly manage filtering settings.

As shown in FIG. 7, items in the filtering setting DB 80 include a type, a range, a set value, and a filtering policy, and a range of checking is expressed by a net mask.

Figures 8, 9:
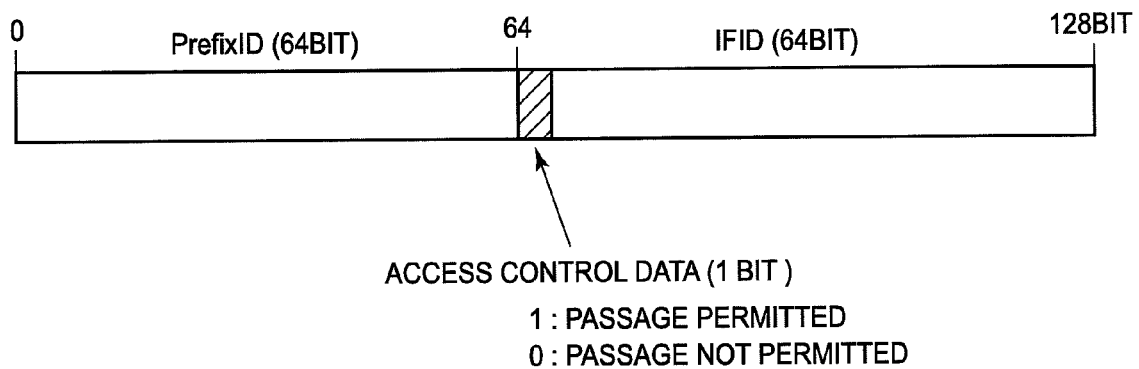
FIG. 8 is a diagram showing a configuration of an IPv6 address according to a first embodiment of the present invention.
FIG. 9 is a diagram showing an example of setting in a communication policy DB according to a first embodiment of the present invention.

There is only one type of filtering policy for the range-specified filtering router 70. As shown in FIG. 8, if the 65th bit of IPv6 address, i.e., a leading bit of IFID, is "1", then passage is permitted. Or, if the 65th bit of IPv6 address is "0", then passage is rejected.

The communication policy DB 90 manages a communication policy of the entire IP network system. The communication policy DB 90 manages, user by user, permission/non-permission for connection of a user terminal, which is connected to the sub-network 120, to the core network 110. As shown in FIG. 9, a data structure of the communication policy DB 90 is composed of such items as "User Name" and "Core Network Connection Policy" indicating permission/non-permission, which is an example of the communication policy.

The address generating/managing server 1000 generates and manages an IP address which is in accordance with a communication policy of the IP network system, for an IP address to be used by the client that succeeded in authentication.

Figure 10:
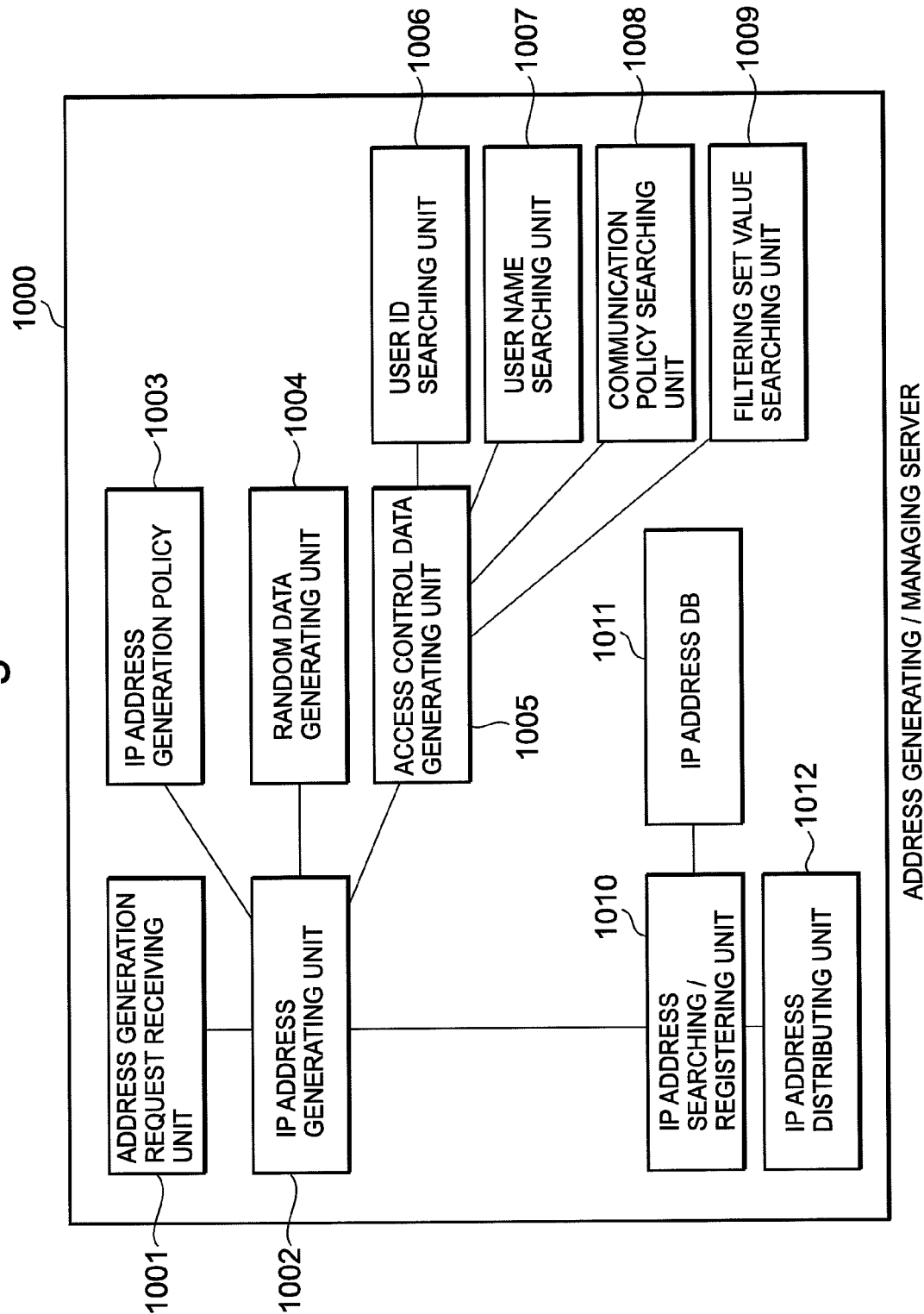
FIG. 10 is a diagram showing a configuration of an address generating/managing server according to a first embodiment of the present invention.

FIG. 10 is a diagram showing a functional configuration of the address generating/managing server 1000. The address generating/managing server 1000 includes address generation request receiving unit 1001, IP address generating unit 1002, IP address generation policy 1003, random data generating unit 1004, access control data generating unit 1005, user ID searching unit 1006, user name searching unit 1007, communication policy searching unit 1008, filtering set value searching unit 1009, IP address searching/registering unit 1010, IP address DB 1011, and IP address distributing unit 1012.

The address generation request receiving unit 1001 receives a request to generate an IP address from the address distributing server 40. IP address generation request information contains a PrefixID, which is information of network for which the IP address is destined for distribution, and a MAC address of a terminal to which the IP address is to be distributed.

The IP address generating unit 1002 generates an IP address based on the PrefixID and the MAC address of the terminal to which the IP address is to be distributed, which have been obtained by the address generation request receiving unit 1001. The IP address generating unit 1002 includes 3 elements, namely, the IP address generation policy 1003, the random data generating unit 1004, and the access control data generating unit 1005.

The IP address generation policy 1003 is a file or a DB configured to manage a method of generating an IP address. As shown in FIG. 11, IP address generation policy 1003 uses a PrefixID obtained from the request as the leading 64 bits, obtains the 65th bit from the access control data generating unit 1005, and obtains the remaining 63 bits from the random data generating unit 1004.

The random data generating unit 1004 generates a random number having a specified number of bits.

The access control data generating unit 1005 generates data for access control based on the MAC address obtained from the request. The access control data generating unit 1005 generates an access control area by using the user ID searching unit 1006, the user name searching unit 1007, the communication policy searching unit 1008, and the filtering set value searching unit 1009.

The user ID searching unit 1006 communicates with the authentication-succeeded-user managing server 60 and searches for a user ID, based on the MAC address.

The user name searching unit 1007 refers to the user information DB 50 and obtains a user name, based on the use ID.

The communication policy searching unit 1008 refers to the communication policy DB 90 and obtains a communication policy, based on the user name.

The filtering set value searching unit 1009 refers to the filtering setting DB 80 and obtains a filtering set value, based on the communication policy. Then, the access control data generating unit 1005 generates access control data based on the filtering set value.

The IP address searching/registering unit 1010 searches the IP address DB 1011 that manages IP addresses to check if there is any address that overlaps with an IP address generated by the IP address generating unit 1002, and registers the IP address if there is no overlapping address.

The IP address distributing unit 1012 distributes the IP address, which has been confirmed by the IP address searching/registering unit 1010 that there is no overlapping IP address, to the terminal that has made the request.

In the following, operations according to the first embodiment of the present invention are described. As a characteristic operation of this embodiment, an operation in which the client 10 obtains an IP address is described.

The client 10 initially has no IP address assigned. After user authentication is performed and an IP address is generated based on user information, the client 10 receives the IP address and, thereby, filtering by using IP addresses based on the user information is enabled.

Figure 12:
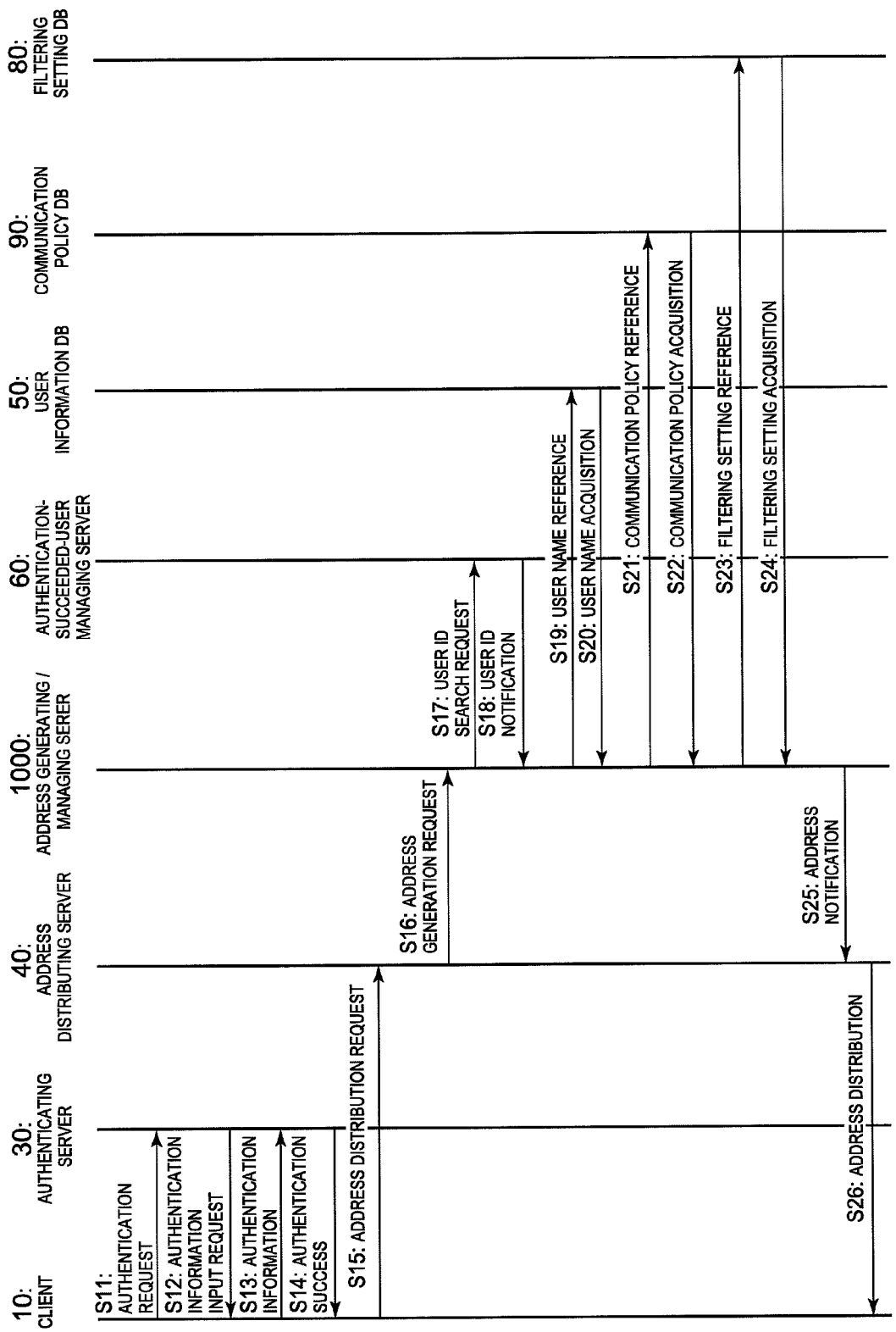
FIG. 12 is a flowchart showing operations till a client obtains an IP address according to a first embodiment of the present invention.

FIG. 12 shows operations of the client 10 obtaining an IP address, which are described sequentially.

First, the client 10 notifies the authenticating server 30 of an authentication request via the AP 20 (step S11).

Upon receiving the authentication request, the authenticating server 30 notifies the client 10 of a request to input authentication information, via the AP 20 (step S12)

Upon receiving the request to input authentication information, the client 10 notifies the authenticating server 30 of the authentication information via the AP 20 (step S13). The authentication information notified here includes a MAC address of a terminal, a user ID, and a password, for example.

Upon receiving the authentication information, the authenticating server 30 verifies the authentication information. If the authentication succeeds, the authenticating server 30 notifies the client 10 of success of the authentication via the AP 20 (step S14).

Upon receiving notification that the authentication was successful, to obtain an IP address, the client 10 notifies the address distributing server 40 of an address distribution request by multicast via the AP 20 (step S15). The communication protocol used here for transmitting the address distribution request is DHCPv6, and the address distribution request contains the MAC address of the terminal.

Upon receiving the address distribution request, the address distributing server 40 notifies the address generating/managing server 1000 of an address generation request (step S16). The address generation request here contains the MAC address of the client 10 that has made the address distribution request, and a PrefixID of the network to which the address distributing server 40 distributes.

Upon receiving the address generation request, to generate an IP address, the address generating/managing server 1000 notifies the authentication-succeeded-user managing server 60 of a user ID search request containing the MAC address (step S17).

Upon receiving the user ID search request, the authentication-succeeded-user managing server 60 searches for a user ID based on the MAC address contained in the user ID search request by referring to the authentication-succeeded-user DB 62. When an appropriate user ID is found, the authentication-succeeded-user managing server 60 notifies the address generating/managing server 1000 of the user ID (step S18).

Upon obtaining the user ID, to obtain a user name, the address generating/managing server 1000 refers to the user information DB 50 by using the user ID (step S19), and obtains the user name (step S20).

Upon obtaining the user name, to obtain a communication policy, the address generating/managing server 1000 refers to the communication policy DB 90 by using the user name (step S21), and obtains the communication policy (step S22).

Upon obtaining the communication policy corresponding to the user name, to obtain filtering setting corresponding to the communication policy, the address generating/managing server 1000 refers to the filtering setting DB 80 by using the communication policy (step S23), and obtains the filtering setting (step S24).

Upon obtaining the filtering setting, the address generating/managing server 1000 generates an IP address based on the obtained filtering setting. Then, the address generating/managing server 1000 notifies the address distributing server 40 of the generated IP address (step S25).

Upon obtaining the IP address, the address distributing server 40 distributes, with DHCPv6 protocol, the IP address to the client 10 that has made the request for address distribution (step S26).

Figure 13:
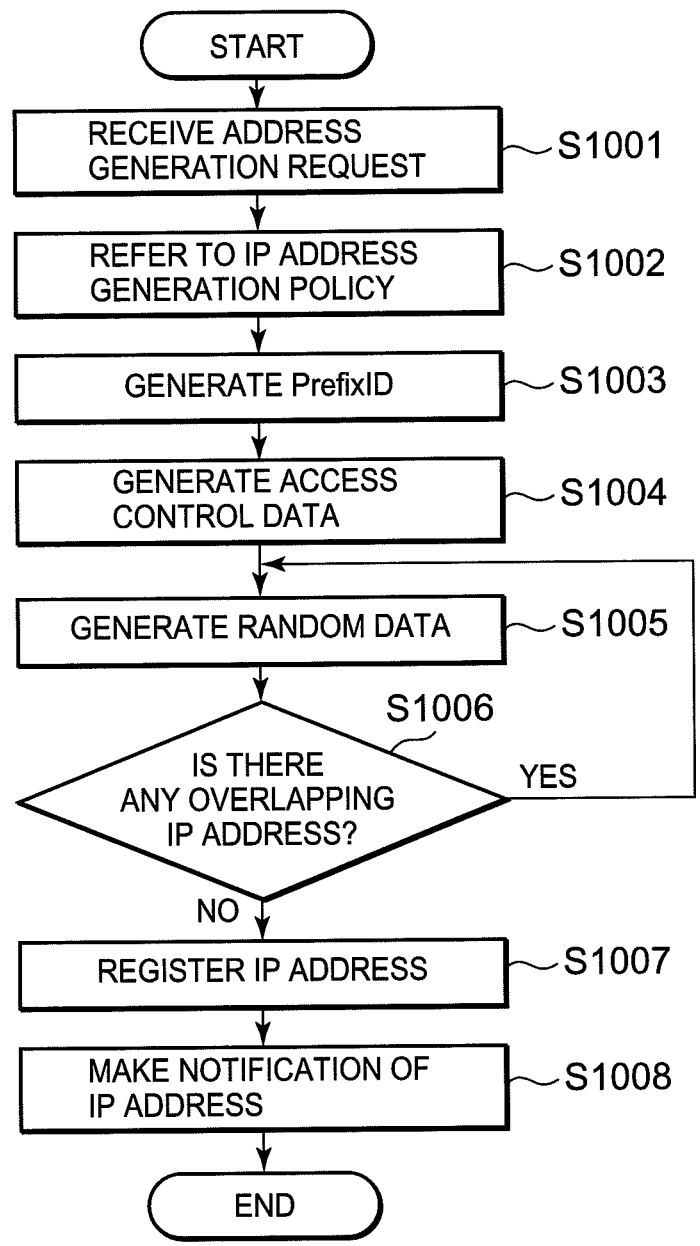
FIG. 13 is a flowchart showing operations of the address generating/managing server according to a first embodiment of the present invention.

Now, detailed operations of the address generating/managing server 1000 are described with reference to FIG. 13.

Upon receiving an address generation request (step S1001), the address generating/managing server 1000 refers to the IP address generation policy 1003 to determine a data structure of an IP address to be generated (step S1002). As shown in FIG. 11, the IP address generation policy 1003 assigns leading 64 bits to the PrefixID obtained from the address generation request, the 65th bit to access control data, and the remaining bits to random data. Then, the address generating/managing server 1000 obtains a PrefixID, to which the leading 64 bits is to be assigned, of the IP address from the address generation request (step S1003).

Then, the access control data, which is the next (i.e. 65th bit), is generated by the access control data generating unit 1005 (step S1004). As shown in FIG. 12, the access control data is generated by obtaining the user ID from the MAC address contained in the address generation request, the user name from the user ID, the communication policy from the user name, and the filtering setting from the communication policy. In this embodiment, as shown in FIG. 7, the set value in the filtering setting DB 80 is "1" when passage is permitted and "0" when passage is rejected. Since the access control data should correspond to the filtering setting, a filtering set value corresponding to the communication policy is set to the IP address.

Lastly, random data is generated for the remaining 63 bits to complete the IP address (step S1005).

The address generating/managing server 1000 searches the IP address DB 1011 that manages IP addresses to check if there is any address overlapping with the generated IP address (step S1006). If there is no overlapping address (step No in step S1006), the address generating/managing server 1000 registers the generated IP address (step S1007). If there is any overlapping address (Yes in step S1006), the address generating/managing server 1000 regenerates random data for the lower 63 bits (step S1005), and performs a search again. Then, the address generating/managing server 1000 notifies the terminal, which has made the request, of the IP address for which it has been confirmed that there is no overlapping IP address (step S1008).

The address generating/managing server 1000 may cause a built-in computer to execute a program to implement each of the operations described above.

A configuration of the IP network system according to a second embodiment of the present invention is the same as FIG. 1, except for the following 2 differences; which are, the configuration of the address generating/managing server 1000 and the configuration of the communication policy DB 90.

Figure 14:
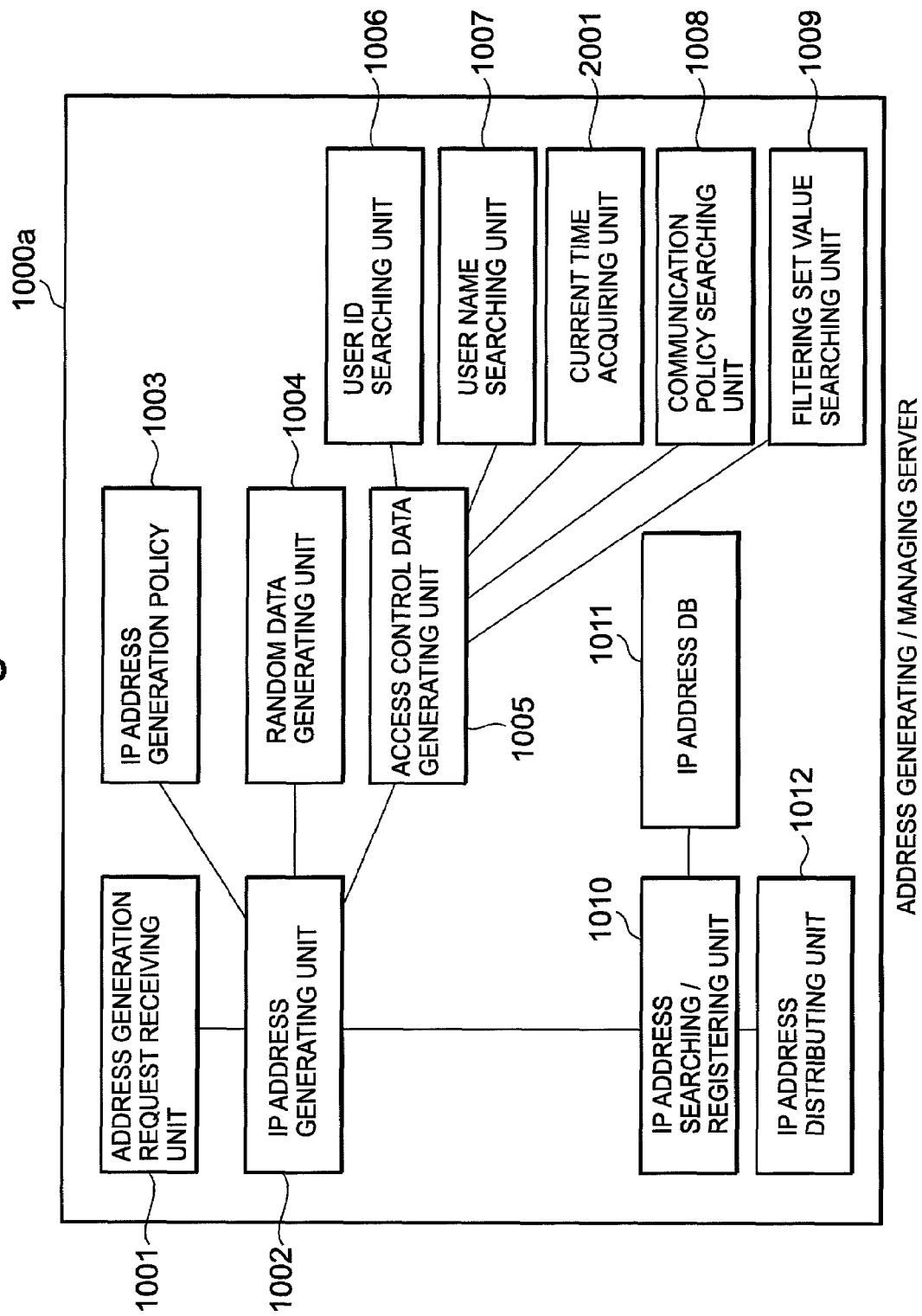
FIG. 14 is a diagram showing a configuration of an address generating/managing sever according to a second embodiment of the present invention.

FIG. 14 shows a functional configuration of the address generating/managing server 1000 according to this embodiment. In FIG. 14, the same symbols as those in FIG. 10 designate same elements, and descriptions thereof are omitted. An address generating/managing server 1000*a* in FIG. 14 differs from the address generating/managing server 1000 shown in FIG. 10 in that a current time acquiring unit 2001 has been added.

The current time acquiring unit 2001 notifies current time when the access control data generating unit 1005 generates access control data. As a method of obtaining current time, the current time acquiring unit 2001 may obtain the current time by using a clock capability in the address generating/managing server, or may obtain the current time from an NTP server that controls time, for example.

FIG. 15 shows a configuration of a communication policy DB 90 according to this embodiment. The communication policy DB 90 in FIG. 15 differs from the communication policy DB 90 shown in FIG. 9 in that "Available Time" has been added to the items of the communication policy DB 90. This makes it possible to combine "User Name" and "Available Time" to determine a "core network connection policy" that serves as a communication policy.

In the following, operations in this embodiment are described. The operations in this embodiment differ from the first embodiment in a procedure to generate access control data of the address generating/managing server 1000*a*, as shown in FIG. 14. In this embodiment, after obtaining a user name from the user name searching unit 1007, the address generating/managing server 1000*a* obtains current time from the current time acquiring unit 2001. Then, the address generating/managing server 1000*a* refers to the communication policy DB 90 in FIG. 15 based on the user name and the current time, and then a core network connection policy is determined.

According to this embodiment, user access control can be dynamically implemented by dynamically varying a communication policy in accordance with Available Time.

A configuration of an IP network access control system according to a third embodiment of the present invention is the same as FIG. 1, except for the following 2 differences; which are, the configuration of the address generating/managing server 1000 and the configuration of the communication policy DB 90.

Figure 16:
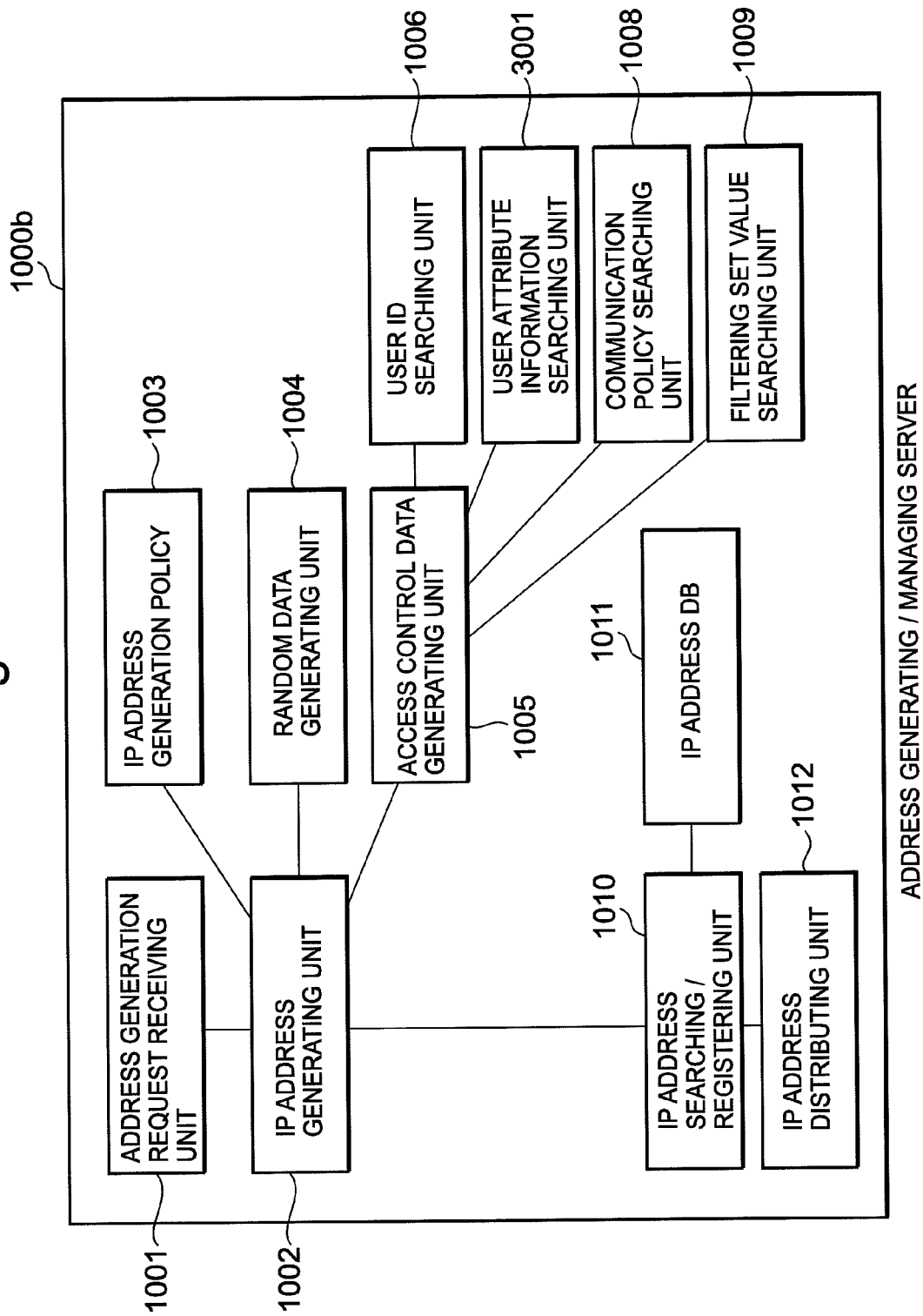
FIG. 16 is a diagram showing a configuration of an address generating/managing server according to a third embodiment of the present invention.

FIG. 16 shows a functional configuration of an address generating/managing server 1000*b* according to this embodiment. In FIG. 16, the same symbols as FIG. 10 represent same elements, and descriptions thereof are omitted. The address generating/managing server 1000*b* in FIG. 16 differs from the address generating/managing server 1000 shown in FIG. 10 in that instead of the user name searching unit 1007, a user attribute information searching unit 3001 has been added.

The user attribute information searching unit 3001 refers to the user information DB 50 and searches and/or obtains user attribute information based on the user ID that the user ID searching unit 1006 obtained. In this embodiment, as shown in FIG. 3, an example of the setting of the user information DB 50, "Department" and "Position" are obtained from the user ID.

FIG. 17 shows a configuration of a communication policy DB 90 according to this embodiment. The communication policy DB 90 in FIG. 17 differs from the communication policy shown in FIG. 9 in that "User Name" is deleted from the items of the communication policy DB 90 and that "Department" and "Position" are added. In this embodiment, thereby, a core network connection policy that serves as a communication policy can be determined based on the user attribute information such as "Department", "Position", etc. or a combination of the user attribute information, rather than being dependant on a user name.

In the following, operations in this embodiment are described. The operations in this embodiment differ in a procedure to generate access control data of the address generating/managing sever 1000*b* as shown in FIG. 16. In this embodiment, after obtaining a user ID from the user ID searching unit 1006, the address generating/managing server 1000b refers to the user information DB 50 and searches for and obtains user attribute information, based on the user ID that the user ID searching unit 1006 obtained with the user attribute information searching unit 3001. Then, the address generating/managing server 1000b refers to the communication policy DB 90 in FIG. 17 and a core network connection policy is determined, based on the obtained user attribute information.

According to this embodiment, access control can be implemented based on user's attribute information, without relying on a unique name of a user.

As a fourth embodiment of the present invention, the communication policy is determined based on user information of a terminal device to which the IP address is distributed, when the IP address is generated.

Here, the IP address may be generated based on a request from the terminal device.

Also, the communication policy may be determined based on available time information associated with the terminal device.

Also, the communication policy may be determined based on user attribute information associated with the terminal device.

As a fifth embodiment of the present invention, by associating user information of the terminal device to which the IP address is distributed with a user ID managed by an authenticating server capable of user authentication, the communication policy based on the user information is determined for the terminal device, the user of which has been successfully authenticated, upon being notified of the user ID made by the authenticating server when the user of the terminal device is successfully authenticated by the authenticating server.

Here, by obtaining a user ID and a layer-2 identifier of the terminal device successfully authenticated by the authenticating server, an IP address specific to the user ID may be generated even when an identical layer-2 identifier exists.

Also, the IP address may be generated based on a request from the terminal device, when the IP address is generated.

Also, the communication policy may be determined based on available time information associated with the terminal device, when the IP address is generated.

Also, the communication policy may be determined based on user attribute information associated with the terminal device, when the IP address is generated.

As a sixth embodiment of the present invention, a latest communication policy is reflected, when the IP address is generated, by referring to the communication policy.

As a seventh embodiment of the present invention, the generated IP address is distributed to the terminal device by using DHCP.

As an eighth embodiment of the present invention, the network layer control device is configured to perform the access control dynamically, by changing data in the access control area of the IP address dynamically when the IP address generating device generates an IP address.

Here, the network layer control device may be configured to perform filtering control of the IP address based on attribute information of a user, by determining the communication policy based on the attribute information of the user of a terminal device to which the IP address is distributed and generating data for the access control area according to the determined communication policy when the IP address generating device generates an IP address.

Also, the terminal device maybe configured to request, when obtaining an IP address, an authenticating device to provide authentication, and to request, if the authentication by the authentication device succeeds, the IP address generating device to generate an IP address to access the IP network system, and the IP address generating device may be configured to generate the IP address based on a request from the terminal device.

Also, the IP address generating device may be configured to determine a communication policy based on available time information associated with the terminal device, when generating the IP address.

Also, the IP address generating device may be configured to determine a communication policy based on user attribute information associated with the terminal device.

According to the present invention, no change to setting for network layer control device such as router is required and load of the setting for network layer control device can be reduced. Thus, the invention can be used in a large-scale network system that requires much setting. In addition, since an access authority of an individual user can be changed in a flexible manner, flexible access control for an individual user is enabled. Therefore, the invention may also be useful in an enterprise network that frequently adds/deletes users.

In addition, each disclosure of the above-mentioned patent documents shall be incorporated herein by reference. In the framework of full disclosure of the present invention (including the Claims), and based on its basic technological idea, an embodiment or a working example may be changed and/or adjusted. In addition, in the framework of the Claims for this invention, different combinations or selections of various elements disclosed here are possible. In other words, of course, the present invention contains various types of variations and modifications that could be achieved by any one skilled in the art according to the full disclosure including the Claims and the technological idea.

While embodiment of the present invention have been described in detail above, it is contemplated that numerous modifications may be made to the above embodiments without departing from the spirit and scope of the embodiments of the present invention as defined in the following claims.

What is claimed is:

1. An IP address generating device comprising:
    an address generation request receiving unit which receives a request to generate an IP address from a terminal device;
    an IP address generating unit which sets a specific area in a node identifier of the IP address as an access control data area, and generates the IP address including a communication policy which is embedded in the access control data area and indicates whether a packet is to be admitted or not, wherein the IP address generating unit generates the IP address in response to the request; and
    a communication policy searching unit which determines the communication policy based on user information for a terminal device to which the IP address is distributed, when the IP address is generated, and
    wherein the access control data area is located at a following bit of a PrefixID field which is included in the request and containing data identifying a network to which the address is to be distributed, and wherein the communication policy consists of a single bit, and the access control data area is located at a leading bit of an interface ID (IFID) when the IP address is an IPv6 address, and the access control data area is located at a host unit when the IP address is an IPv4 address.

2. The IP address generating device according to claim 1, wherein the communication policy searching unit determines the communication policy based on available time information associated with the terminal device, wherein the available time information indicates a time when access is permitted to be granted.

3. The IP address generating device according to claim 1, wherein the communication policy searching unit determines the communication policy based on user attribute information associated with the terminal device.

4. The IP address generating device according to claim 1, further comprising: a user ID searching unit which manages a user ID associated with user information of a terminal device to which the IP address is distributed, and notifies a user ID made by an authentication server when a user of the terminal device is successfully authenticated by the authenticating server, and
wherein the communication policy searching unit determines the communication policy based on the user information associated with the user ID.

5. The IP address generating device according to claim 4, wherein the user ID searching unit obtains the user ID and a layer-2 identifier of the terminal device successfully authenticated by the authenticating server, and
the IP address generating unit generates an IP address specific to the user ID even if a layer-2 identifier of the terminal device is identical to another layer-2 identifier.

6. The IP address generating device according to claim 4, wherein the communication policy searching unit determines the communication policy based on available time information associated with the terminal device, when the IP address is generated.

7. The IP address generating device according to claim 4, wherein the communication policy searching unit determines the communication policy based on user attribute information associated with the terminal device, when the IP address is generated.

8. An IP network system comprising:
a network control device that performs access control, and
an address generation request receiving unit which receives a request to generate an IP address from a terminal device;
an IP address generating device that sets a specific area in a node identifier of an IP address as an access control area, and generates the IP address including a communication policy which is embedded in the access control area and indicates whether a packet is to be admitted or not, wherein the IP address generating unit generates the IP address in response to the request;
wherein the network layer control device is configured to perform filtering setting according to the communication policy which consists of a single bit;
wherein the IP address generating device is configured to determine the communication policy based on user attribute information associated with the terminal device; and
wherein the access control data area is located at a following bit of a PrefixID field which is included in the request and containing data identifying a network to which the address is to be distributed, and wherein the access control data area is located at a leading bit of an interface ID (IFID) when the IP address is an IPv6 address, and the access control data area is located at a host unit when the IP address is an IPv4 address.

9. The IP network system according to claim 8, wherein the network layer control device is configured to perform the access control dynamically, by changing data in the access control area of the IP address dynamically when the IP address generating device generates an IP address.

10. The IP network system according to claim 8, further comprising a terminal device,
wherein the network layer control device is configured to perform filtering control of the IP address based on attribute information of a user, by determining the communication policy based on the attribute information for the user of the terminal device to which the IP address is distributed and to generate data for the access control area according to the determined communication policy when the IP address generating device generates the IP address.

11. The IP network system according to claim 10, further comprising an authenticating device,
wherein the terminal device is configured to request, when obtaining the IP address, the authenticating device to provide authentication, and to request, if the authentication by the authentication device succeeds, the IP address generating device to generate the IP address to access the IP network system.

12. An IP address generating method, with which an IP address generating device generates an IP address for a terminal device, the method comprising:
setting a specific area in a node identifier of the IP address as an access control area; and
generating an IP address including a communication policy which is embedded in the access control area and indicates whether a packet is to be admitted or not;
wherein the communication policy is determined based on user information for the terminal device to which the IP address is distributed, when the IP address is generated, and the communication policy consists of a single bit, and the access control data area is located at a leading bit of an interface ID (IFID) when the IP address is an IPv6 address, and the access control data area is located at a host unit when the IP address is an IPv4 address, and
wherein the IP address is generated in response to a request from the terminal device by locating the access control data area at a following bit of a PrefixID field which is included in the request and containing data identifying a network to which the address is to be distributed.

13. The IP address generating method according to claim 12, wherein the communication policy is determined based on available time information associated with the terminal device, wherein the available time information indicates a time when access is permitted to be granted.

14. The IP address generating method according to claim 12, wherein the communication policy is determined based on user attribute information associated with the terminal device.

15. The IP address generating method according to claim 12, wherein, by associating user information of the terminal device to which the IP address is distributed with a user ID managed by an authenticating server capable of user authentication, the communication policy based on the user information is determined for the terminal device, the user of which has been successfully authenticated, upon being notified of the user ID made by the authenticating server when the user of the terminal device is successfully authenticated by the authenticating server.

16. The IP address generating method according to claim 15, wherein by obtaining the user ID and a layer-2 identifier of the terminal device successfully authenticated by the authenticating server, an IP address specific to the user ID is generated even if the layer-2 identifier of the terminal device is identical to another layer-2 identifier.

17. A method of controlling access in an IP network system including a terminal device, a network layer control device, and an IP address generating device, the method comprising:
- a setting and generating operation of the IP address generating device comprising setting a specific area in a node identifier of an IP address as an access control area and generating an IP address including a communication policy which is embedded in the access control area and indicates whether a packet is to be admitted or not, wherein the IP address is generated in response to a request from the terminal device by locating the access control data at a following bit of a PrefixID field which is included in the request and containing data identifying a network to which the address is to be distributed;
- a receiving and accessing operation of the terminal device comprising receiving the IP address generated by the IP address generating device and accessing the IP network system with the received IP address; and
- a controlling operation of the network layer control device having the filtering setting set according to the communication policy comprising performing access control according to the communication policy, based on the IP address issued by the terminal device;
- wherein the communication policy is generated based on user attribute information associated with the terminal device, and the communication policy consists of a single bit, and the access control data area is located at a leading bit of an interface ID (IFID) when the IP address is an IPv6 address, and the access control data area is located at a host unit when the IP address is an IPv4 address.

18. The method of controlling access according to claim 17, the IP network system further comprising an authentication device, wherein the method further comprises:
- a requesting operation of the terminal device comprising requesting the authentication device to provide authentication when obtaining an IP address; and
- a requesting operation of the terminal device comprising requesting the IP address generating device to generate the IP address to access the IP network system if the authentication by the authentication device succeeds.

19. A computer readable non-transitory memory containing a program of instructions for enabling a computer, serving as an IP address generating device configured to generate an IP address for a terminal device, to execute processes, comprising:
- a setting process comprising setting a specific area in a node identifier of the IP address as an access control area; and
- a generating process comprising generating the IP address including a communication policy which is embedded in the access control area and indicates whether a packet is to be admitted or not;
- wherein the IP address is generated in response to a request from the terminal device by locating the access control data area at a following bit of a PrefixID field which is included in the request and containing data identifying a network to which the address is to be distributed; and
- wherein the communication policy is determined based on user information for a terminal device to which the IP address is distributed, when the IP address is generated, and the communication policy consists of a single bit, and the access control data area is located at a leading bit of an interface ID (IFID) when the IP address is an IPv6 address, and the access control data area is located at a host unit when the IP address is an IPv4 address.

20. The computer readable non-transitory memory containing the program according to claim 19, wherein the communication policy is determined based on available time information associated with the terminal device, wherein the available time information indicates a time when access is permitted to be granted.

21. The computer readable non-transitory memory containing the program according to claim 19, wherein the communication policy is determined based on user attribute information associated with the terminal device.

22. The computer readable non-transitory memory containing the program according to claim 19, wherein by associating the user information for the terminal device to which the IP address is distributed with a user ID managed by an authenticating server capable of user authentication, the communication policy based on the user information is determined for the terminal device, the user of which has been successfully authenticated, upon being notified of the user ID made by the authenticating server when the user of the terminal device is successfully authenticated by the authenticating server.

23. The computer readable non-transitory memory containing the program according to claim 22, wherein by obtaining a user ID and a layer-2 identifier of the terminal device successfully authenticated by the authenticating server, an IP address specific to the user ID is generated even if the layer-2 identifier of the terminal device is identical to another layer-2 identifier.

24. A computer readable non-transitory memory containing a an IP address generated by an IP address generating unit for a terminal device, comprising:
- a specific area which is set in a node identifier of the IP address as an access control area, and
- wherein the IP address includes a communication policy which is embedded in the access control area, and includes whether a packet is to be admitted or not;
- wherein the communication policy is determined based on user information for a terminal device to which the IP address is distributed, and consists of a single bit;
- wherein the IP address further comprises a PrefixID field containing data identifying a network to which the address is to be distributed, and the access control data area is located at a following bit of the PrefixID field; and
- wherein the access control data area is located at a leading bit of an interface ID (IFID) when the IP address is an IPv6 address, and the access control data area is located at a host unit when the IP address is an IPv4 address.

25. A computer readable non-transitory memory containing an IP address generated by an IP address generating unit for a terminal device, comprising:
- a specific area which is set in a node identifier of the IP address as an access control area; and
- wherein the IP address includes a communication policy which is embedded in the access control area, and includes whether a packet is to be admitted or not;
- wherein the communication policy is determined based on user information for a terminal device to which the IP address is distributed, and consists of a single bit;
- wherein the IP address for a terminal device further comprises a PrefixID field containing data identifying a network to which the address is to be distributed, and the access control data area is located at a following bit of the PrefixID field; and
- wherein the access control data area is located at the 65th bit of the address.

* * * * *